United States Patent Office 3,100,104
Patented Aug. 6, 1963

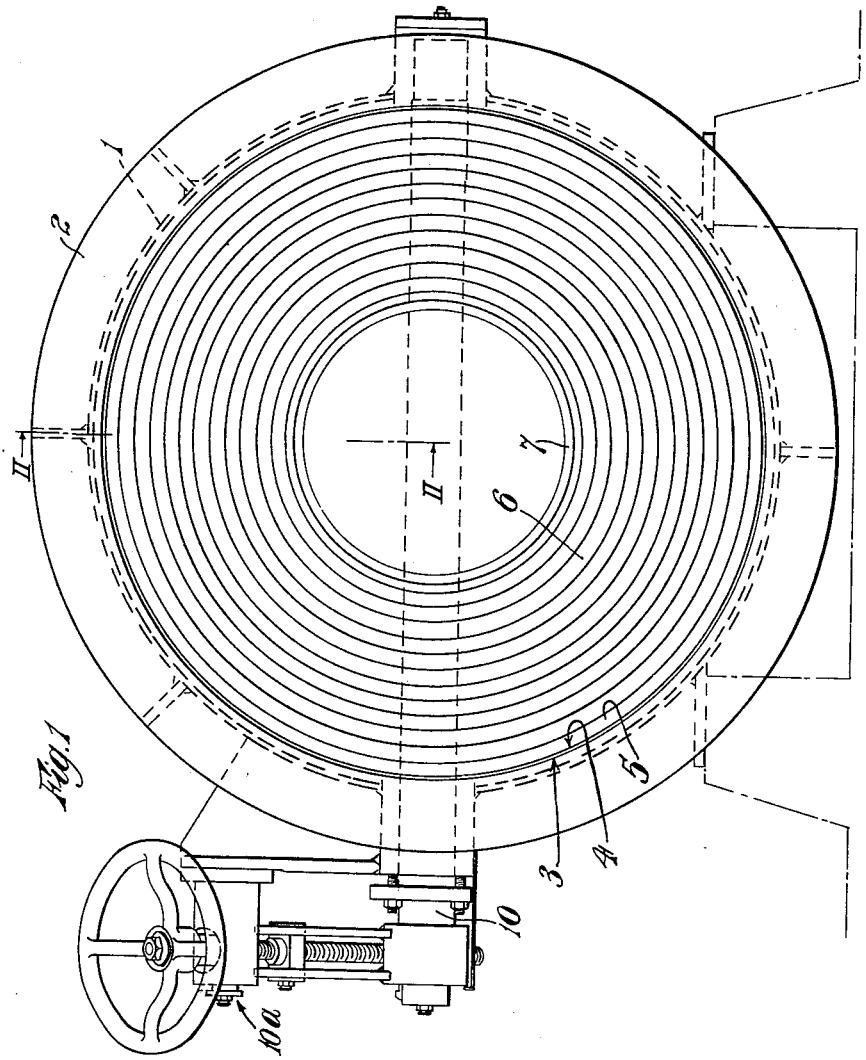

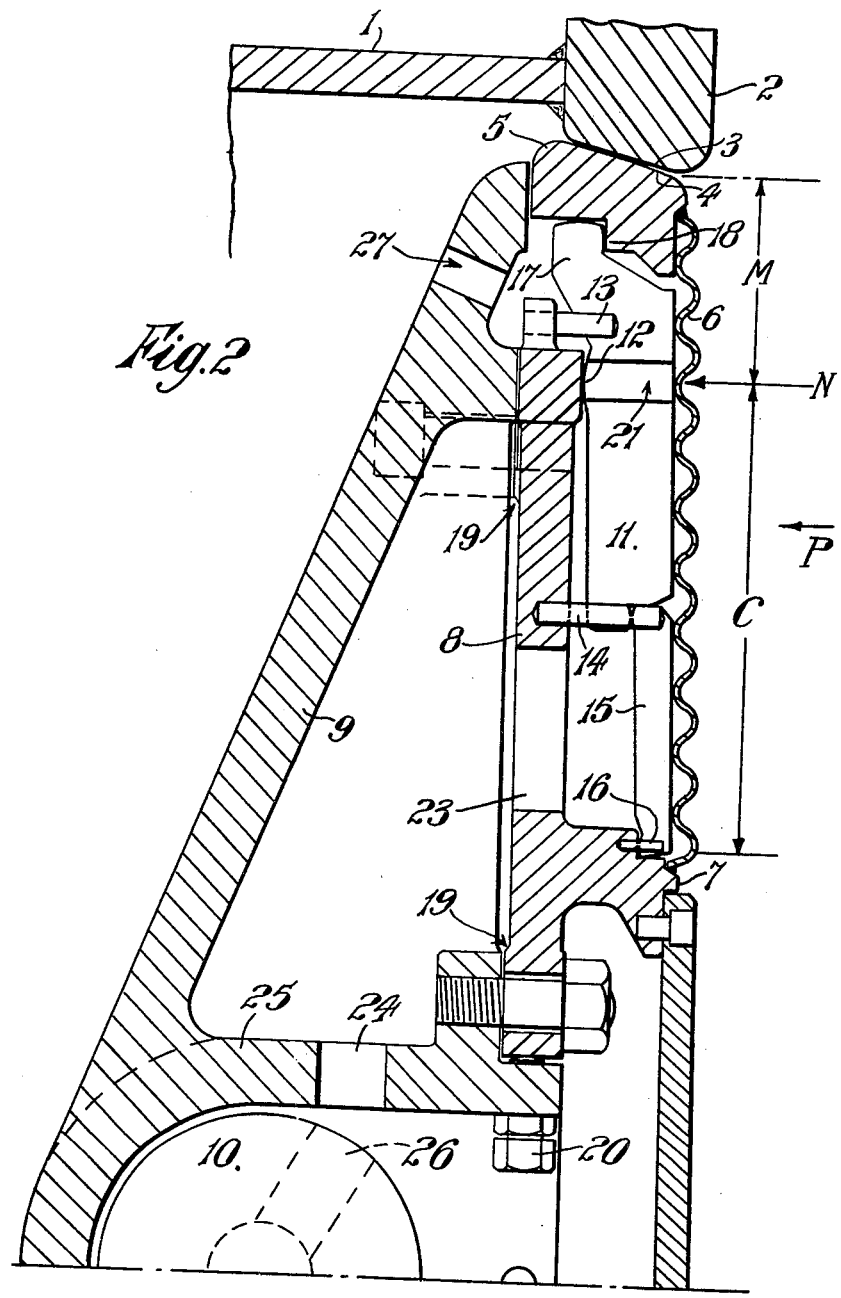

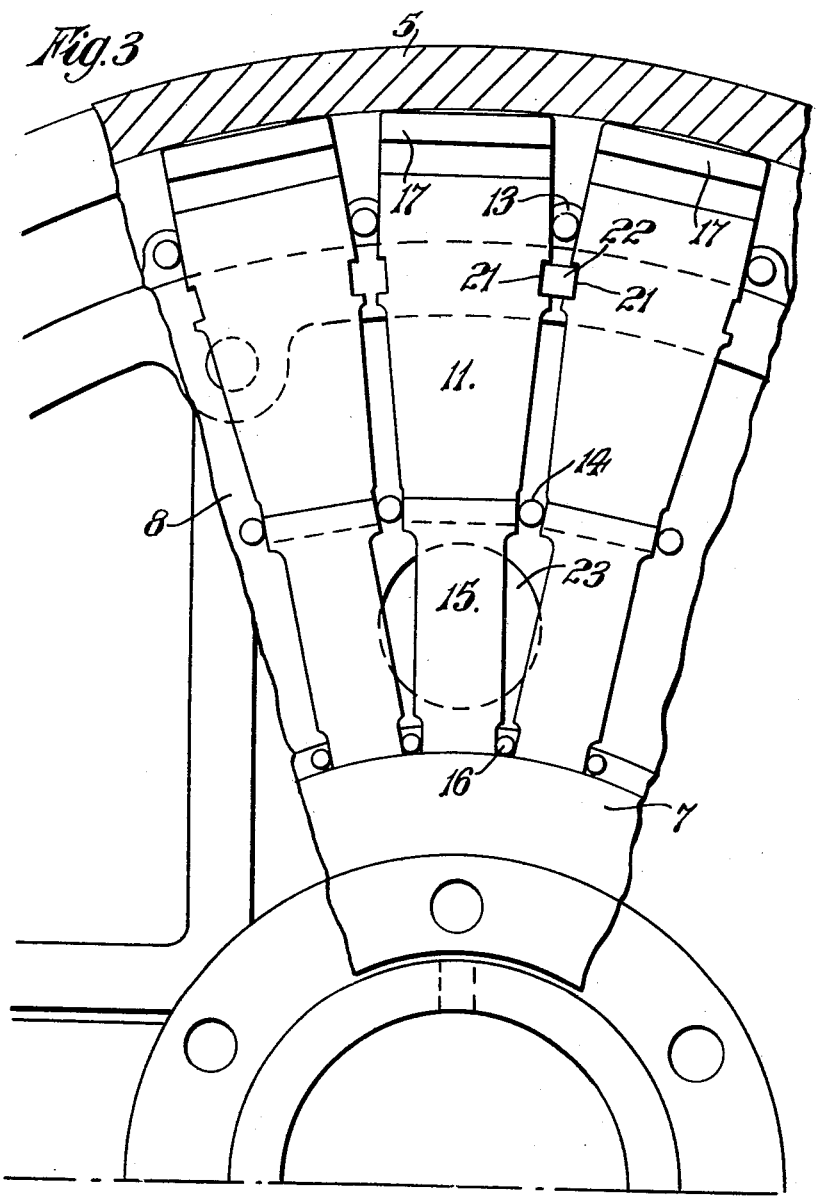

3,100,104
BUTTERFLY VALVE HAVING A SEALING SURFACE MOUNTED FOR AXIAL MOVEMENT
Walter Lancelot Moore, Cerne Abbas, Dorset, England, assignor to Boving and Co. Limited, London, England, a British company
Filed Mar. 30, 1960, Ser. No. 18,716
Claims priority, application Great Britain Apr. 10, 1959
15 Claims. (Cl. 251—175)

This invention relates to butterfly valves, namely valves each comprising a disc, also called a blade, pivoted in an internally cylindrical casing which the disc can obturate when turned into a transverse position perpendicular to the axis of the casing.

The butterfly valves with which the invention is concerned are relatively large valves, e.g. up to 36 inches or even larger in diameter, and are sealed by a peripheral packing. The invention provides such a valve particularly suitable for controlling flow through a pipe of hot gas, at temperatures which the usual peripheral sealing means, such as an inflated rubber hose, will not withstand.

The invention includes a peripheral sealing means which is particularly intended to be used in a butterfly valve which has a valve disc pivoted about a transverse axis substantially parallel to but offset from the plane of a sealing periphery of the disc and a continuous-ring packing around the sealing periphery. Offsetting of the pivotal axis enables a continuous ring to extend around the sealing periphery of the disc without diversion or interruption of peripheral packing at the pivotal axis of the disc.

However, the possibility of the invention being applied to sealing by means of an interrupted or non-continuous ring is not excluded.

According to the invention, in a butterfly valve, comprising a circular valve disc pivoted about a transverse axis in a cylindrical valve casing, means for providing a peripheral seal between the disc and the casing comprises a circular flexible diaphragm arranged to deflect about a concentric circular node so as to move a sealing member, carried by the diaphragm, axially against a seat.

By a "circular node" is meant a circular line of rest in deflection of the diaphragm at an intermediate radius thereof.

Preferably, the circular node is at an intermediate radius in an annular diaphragm so that an axial force effective on the diaphragm at one periphery thereof causes an opposite axial movement of the other periphery. In other words, the deflection of the diaphragm is rather like that of a disc which is axially buckled, or supported by a concentric ring of intermediate radius, so that a load applied at the centre of the disc causes opposite movement of the edge, or vice versa.

The use of a flexible diaphragm in accordance with the invention enables sealing to be effected by movement and deflection, as distinct from compression or distention, of a sealing ring which can therefore be of a hard material, such as metal, resistant to high temperature instead of a relatively soft material, such as rubber, which is not so resistant. The diaphragm also can be of metal and may be corrugated to give flexibility.

In the preferred construction, an annular diaphragm is mounted over one face of the valve disc and carries at its outer periphery a frusto-conical sealing ring which has some flexibility of shape so as to conform to a surrounding frusto-conical seat in the wall of the valve casing when moved, by deflection of the diaphragm, axially against the seat.

It would of course be possible to mount the diaphragm by its outer periphery in the wall of the valve casing and provide the sealing ring on the inner periphery to seal against a seat on the valve disc but such an arrangement would increase the over-all diameter of the valve and it is better to utilize the area of the valve disc.

The force used to deflect the diaphragm to effect the seal is preferably the pressure of the fluid being controlled but an auxiliary mechanical or other force could be used.

The arrangement could be such that, when the valve disc is in the closed position, the pressure of fluid on the upstream side deflects the annular diaphragm, e.g. to slightly conical shape, to move the sealing ring in the direction of flow against the seat.

In a preferred arrangement however, in which the diaphragm is supported against the upstream pressure and has a more positive action, the diaphragm forms the major part of the upstream face of the valve disc, is supported by a circular array of radial levers, fulcrummed in the disc at the radius of the circular node of the diaphragm, and has a central portion, within its circular node, of greater area than an outer marginal portion so that upstream pressure deflects the central portion in the downstream direction to move the outer marginal portion, and therewith the sealing ring, axially upstream to effect sealing against the casing seat.

The preferred shape for a valve disc, having an offset pivotal axis, is a shallow dish shape and this conveniently accommodates the radial levers which support the diaphragm as a closure across the mouth of the dish shape.

The invention will now be more fully described with reference to the accompanying drawings which show one construction, by way of example, and in which:

FIG. 1 is an axial elevation, looking from upstream, of a butterfly valve.

FIG. 2 is an axial half-section, on the line II—II of FIG. 1 but on a larger scale, of a butterfly valve disc and its casing seat, and FIG. 3 is a transverse view from upstream of a sector of the valve disc with the diaphragm and some of the levers omitted.

In the cylindrical wall 1 of the valve casing is mounted a ring seat 2 having a frusto-conical inner surface 3 against which seals the outer, spherical, surface 4 of a frusto-conical sealing ring 5 carried by the outer periphery of a concentrically corrugated metal diaphragm 6, the inner periphery of which is joined to a central boss 7 of a circular plate 8 mounted coaxially within the mouth of a conically dished blade 9 which is the main component of the whole valve disc.

The blade 9 is pivoted, about a transverse axis offset from the plane of the sealing ring 5, by a pivotal shaft 10 mounted in bearings in the wall of the valve casing and provided with handwheel and screw valve-operating mechanism, indicated generally as 10a in FIG. 1, by which the valve disc can be turned in the usual manner.

The diaphragm 6 forms the major part of the upstream face of the valve disc.

Radial levers 11, arranged as a circular array like the spokes of a wheel, rest, each by a rocking fulcrum 12, against the side of the rim of the plate 8, are laterally located, by rings of spaced studs 13 and 14, and support the diaphragm 6. Bridge pieces 15, in inward radial extension of the levers 11, rest by their ends, in rebates in the inner ends of the levers 11 and a rebate in the boss 7 respectively, are laterally located, by the ring of spaced studs 14 and an innermost ring of studs 16, and complete with the levers 11 the support of the diaphragm against the upstream pressure (indicated by the arrow P in FIG. 2) of fluid, hot gas, of which the valve controls the flow.

The outer end of each lever 11 has a toe 17 against which bears a stout flange 18 of the sealing ring 5.

The plate 8, and therewith the sealing ring 5, is adjustable axially and transversely with respect to the blade 9 by shims at 19 and set screws 20 respectively. This enables initial setting of the sealing ring 5 against the seat 2 to be effected.

The operation of the valve, as so far described, is as follows:

When the valve disc is turned into the closed position, the sealing ring surface 4 approaches closely the seat surface 3, flow of fluids is almost cut off and the upstream pressure P is then much higher than the downstream pressure which reigns also within the blade 9 behind the diaphragm 6.

The area of the central portion C (see FIG. 2) of the diaphragm 6, within the radius of the fulcra 12 of the levers 11, is substantially greater than the area of the outer marginal portion M beyond such radius and both areas are subject to the same pressure P. The axial fluid load on C is greater than that on M and, the diaphragm 6 transmitting the pressure, the resultant moment on the levers 11 rocks them about their fulcra 12 so that their inner ends move downstream and their outer ends, by the toes 17, thrust the sealing ring 5 upstream to seal the surface 4 against the seat surface 3. In rocking of the levers 11, the diaphragm 6 deflects slightly conically about a circular node at N at the radius of bearing of the fulcra 12.

The sealing ring 5 although of a hard material, such as stainless steel, has sufficient resilience of shape to deflect and conform closely to the seating surface 3 to effect a continuous peripheral seal thereagainst.

The bridge pieces 15 transmit to the inner ends of the levers 11 the pressure load on the portion of the diaphragm which they support. In a low-pressure valve, when the loading at the fulcra 12 would not be excessive, the bridge pieces 15 may be omitted, the inner peripheral margin of the diaphragm 6 being secured to the outer periphery of a rigid circular plate which then forms the central portion of the diaphragm. The rim of this plate, by its inner side, rests against the inner ends of the levers 11.

Before a closed and sealed valve is opened, the seal should be "cracked" so that the valve disc can safely be turned and means are therefore provided in the present valve for this purpose.

At the radius of their fulcra, the levers 11 have lateral notches 21 which, in opposed pairs between adjacent levers, locate floating packing pieces 22 (see FIG. 3) providing, with the levers 11 and between the diaphragm 6 and the rim of the plate 8, an annular partition which will delay, but not prevent, radial fluid flow between the central and outer marginal portions of the interior of the valve disc corresponding to the diaphragm portions C and M.

The plate 8 has apertures 23 and the blade 9 has apertures 24, in an internal web 25, to provide free access to the inner side of the diaphragm 6, within the central portion C, for fluid at upstream pressure, admitted through a port 26 in the shaft 10, when a valve-controlled by-pass (not shown) is opened as a preliminary to opening of the butterfly valve. The blade 9 is vented downstream, behind the diaphragm portion M, by holes 27.

The admission of fluid at upstream pressure to the central portion of the blade disc momentarily substantially balances the upstream pressure P on the diaphragm 6 over its central portion C, the annular partition provided by the packing pieces 22 delaying radially outward and downstream leakage of fluid from the central portion of the valve disc. The upstream pressure then still effective over the outer marginal portion M of the diaphragm 6 rocks the outer ends of the levers 11 and therewith moves the sealing ring 5 downstream to crack the seal. The blade disc is then free to be turned for normal opening.

I claim:

1. A butterfly valve comprising two main parts, namely a cylindrical casing and a circular valve disc pivoted in said casing about an axis transverse to the axis of said casing, means for turning said valve disc about its pivotal axis to closed and open positions respectively in said casing, a first peripheral sealing surface member on said casing, a second peripheral sealing surface member on said valve disc, said sealing surface members being mutually opposed in surface sealing contact in said closed position of said valve disc, a circular flexible diaphragm on one of said main parts and carrying one of said sealing surface members, and means on said one of said main parts supporting said diaphragm intermediately radially across a concentric circular line of rest in deflection of said diaphragm and defining therein a circular node about which deflection of said diaphragm effects axial movement of the sealing surface member carried by said diaphragm.

2. A butterfly valve according to claim 1, in which said diaphragm is annular, said sealing surface member carried by said diaphragm is secured to a periphery of said diaphragm, and said supporting means are pivoted about fulcra at said circular node.

3. A butterfly valve acording to claim 2, in which said supporting means comprises a circular array of radial levers.

4. A butterfly valve according to claim 3, in which said diaphragm is carried by said valve disc and extends over the upstream face thereof, said periphery of said diaphragm is the outer periphery thereof, and said levers are pivotally supported on said valve disc about said fulcra at the radius of said node, said node being nearer said outer periphery than said inner periphery of said diaphragm.

5. A butterfly valve according to claim 4, in which said sealing surface member secured to said diaphragm is a frusto-conical ring of hard material having resilience of shape.

6. A butterfly valve according to claim 5, in which said diaphragm is concentrically corrugated.

7. A butterfly valve according to claim 1, in which said diaphragm is carried by said valve disc and extends over the upstream face thereof, said sealing surface member is secured to the outer periphery of said diaphragm and the area of said diaphragm within said node is greater than the area thereof radially beyond said node.

8. A butterfly valve according to claim 7 in which said valve disc comprises a shallow dish, said diaphragm constitutes a closure across the mouth of said dish, annular partition means are provided in said dish at the radius of said node and means are provided for admitting fluid to said dish at the inner side of said diaphragm and radially within said annular partition means.

9. A butterfly valve according to claim 8, a circular array of radial levers pivoted in said dish about fulcra at said node and supporting said diaphragm, and packing pieces between said levers at the radius of the fulcra thereof, said packing pieces forming with said levers said annular partition.

10. A butterfly valve disc comprising a circular dish, a circular flexible diaphragm extending over the mouth of said dish, a sealing surface ring secured to the outer periphery of said diaphragm and means in said dish supporting said diaphram intermediately radially across a concentric line of rest in deflection of said diaphragm and defining therein a circular node about which deflection of said diaphragm effects axial movement of said sealing surface ring.

11. A butterfly valve disc according to claim 10, in which said supporting means comprises a circular array of radial levers.

12. A butterfly valve disc according to claim 11, in which said diaphragm is annular.

13. A butterfly valve disc according to claim 12, in which said diaphragm is concentrically corrugated.

14. A butterfly valve comprising a cylindrical casing, a sealing surface ring in said casing and having a frusto-conical inner sealing surface, a valve disc comprising as its main component a circular dish pivoted in said casing about an axis transverse to the axis of said casing, means for turning said valve disc about said axis to closed and open positions respectively in said casing, an annular, circular flexible diaphragm forming a major part of the upstream face of said valve disc and closing the mouth of said dish, a sealing ring secured to the outer periphery of said diaphragm and having a frusto-conical outer sealing surface opposed in surface sealing contact with said inner sealing surface in said closed position of said valve disc, and a circular array of radial levers in said valve disc fulcrumed at an intermediate radius of said valve disc and supporting said diaphragm radially across a concentric line of rest in deflection of said diaphragm and defining therein at said radius a circular node about which deflection of said diaphragm effects axial movement of said sealing ring.

15. A butterfly valve according to claim 14, and packing pieces between said levers at the radius of the fulcra thereof, said packing pieces forming with said levers an annular partition in said dish, means for admitting fluid from the upstream side of said dish to the interior thereof within said annular partition and means venting said dish downstream radially beyond said annular partition.

References Cited in the file of this patent

UNITED STATES PATENTS

| | | |
|---|---|---|
| 2,816,729 | Jensen | Dec. 17, 1957 |
| 2,893,682 | Hintzman | July 7, 1959 |
| 2,923,522 | Reppert | Feb. 2, 1960 |
| 3,020,019 | Fawkes | Feb. 6, 1962 |

OTHER REFERENCES

Waldenmaier, German application printed March 20, 1958; 1,026,587 (KL 47g 40/03), 1 sht. dwg.; 1 p. spec.